(12) United States Patent
Reid et al.

(10) Patent No.: US 10,184,605 B2
(45) Date of Patent: Jan. 22, 2019

(54) PIPE ACCESS TOOL

(71) Applicants: John Reid, St. John, IN (US); Kevin Reid, Tinley Park, IL (US); Eric Reid, St. John, IN (US); Ryan Reid, St. John, IN (US)

(72) Inventors: John Reid, St. John, IN (US); Kevin Reid, Tinley Park, IL (US); Eric Reid, St. John, IN (US); Ryan Reid, St. John, IN (US)

( * ) Notice: Subject to any disclaimer, the term of this patent is extended or adjusted under 35 U.S.C. 154(b) by 0 days.

(21) Appl. No.: 15/461,193

(22) Filed: Mar. 16, 2017

(65) Prior Publication Data

US 2018/0266610 A1   Sep. 20, 2018

(51) Int. Cl.
| | |
|---|---|
| *F16L 41/06* | (2006.01) |
| *F16L 41/12* | (2006.01) |
| *B23B 51/04* | (2006.01) |
| *F16L 41/16* | (2006.01) |

(52) U.S. Cl.
CPC .......... *F16L 41/06* (2013.01); *B23B 51/0406* (2013.01); *F16L 41/12* (2013.01); *F16L 41/16* (2013.01); *B23B 2215/72* (2013.01); *Y10T 137/6123* (2015.04)

(58) Field of Classification Search
CPC . F16L 41/06; F16L 41/12; F16L 41/16; F16L 41/04; F16L 41/08; Y10T 137/6123; Y10T 137/612
USPC .......................................... 137/318
See application file for complete search history.

(56) References Cited

U.S. PATENT DOCUMENTS

| | | | | |
|---|---|---|---|---|
| 2,299,814 | A * | 10/1942 | Gale et al. | F16L 41/04 137/320 |
| 3,799,182 | A * | 3/1974 | Long | F16L 41/04 137/15.14 |
| 5,030,039 | A * | 7/1991 | Dole | F16L 41/04 137/15.14 |
| 6,491,057 | B1 * | 12/2002 | Collins | F16L 41/04 137/15.14 |
| 7,137,403 | B2 * | 11/2006 | Hombravella Abbad et al. | B23B 41/00 137/318 |
| 7,552,742 | B2 * | 6/2009 | Dole | F16L 41/06 137/238 |
| 2013/0206252 | A1 * | 8/2013 | Leto | F16L 41/06 137/318 |

* cited by examiner

*Primary Examiner* — Kevin Lee
(74) *Attorney, Agent, or Firm* — Daniel Zamudio

(57) ABSTRACT

A hand tool that is capable of efficiently, inexpensively, and quickly attaching to a pipe and allows for boring an access hole to be used for accessing the inside of the pipe and unclogging the pipe.

9 Claims, 3 Drawing Sheets

PIPE ACCESS TOOL

CROSS-REFERENCE TO RELATED APPLICATIONS

The present application claims the benefit of U.S. Provisional Patent Application No. 62/313,410, filed Mar. 25, 2016, the entirety of which is hereby incorporated by reference, including its specification.

BACKGROUND

The United States Census Bureau reports that in July of 2014 there were more than 130 Million households in the country. Nearly 70% of these are owner occupied having a connection to a public or private sewer system. Commercial properties are generally mandated by local governments to have sufficient connections to the sewer systems. In fact, more and more municipalities require that these homes connect to a sewer system via an overhead sewer system. When an overhead sewer system backs up the sewer pipes become pressurized.

Unclogging pressurized pipes can cause water damage to a home. Such work can also create an unsightly and foul smelling mess that results from the pressurized contents spraying from the pipes. Add to this a general lack of expertise or dislike for do-it yourself plumbing and it is easy to understand how property owners would benefit from assistance with unclogging overhead sewer systems, and preventing specific plumbing problems that might harm ones property.

There is a need in the industry for an apparatus that is easy to use, inexpensive, and assists property owners in clearing clogged overhead sewer systems or any pipe systems that are pressurized.

SUMMARY

The present invention is directed to an apparatus and process that satisfies this need, the utility of which is characterized by a multi-piece designed hand tool that easily attaches to a pipe and provides the functionalities of boring, clearing, accessing, and generally maintaining an overhead sewer system. The present invention is the first multi-piece hand tool with flexible sizing, easy attachments, and which provides a clear path for fluid and materials, such as waste water, to travel in or out of a pipe, especially a pressurized pipe.

We have invented a novel hand tool comprising a main body to which a head is removably attached. The body and head are attached via a fastener that allows for quick attaching and detaching. The head size can be changed to accommodate differently sized pipes, or an insert can be used with the head to accommodate differently sized pipes. A borer is slidably attached to the main body. The borer having a borer arm and a tooth section. The borer is best if sized to cut a 2¼ inch hole which then limits the need to change borers for differently sized pipes. The borer is similar to a hole saw in its best mode because a drill bit alone will vibrate and will also not provide a large enough hole to achieve the invention's objectives. The borer arm passes through an entry port that is part of the main body and slides along the axis of the main body. The tooth section is capable of fitting into a channel of the hand tool. The channel being located inside of the hand tool and traversing along the axis of the main body and extending sufficiently near to a pipe's access cover, such as a sewer system clean-out. The borer being capable of rotating. The tooth section being capable of boring through the workpiece. Once the workpiece is completely bored through, the bored portion of the workpiece can remain with the tooth section. After boring, the borer can be slidably moved to a position that prevents obstructing a clear path for water and solids to travel and exit the work area through a hose. A valve is attachable to the man body to control the flow of water and solids. After the pipe is cleared, the water and solid can be pumped into the clear path in the opposite direction and placed back into the pipe, now cleared.

One embodiment of the invention comprises an enclosure that has at least one sealed opening. The enclosure is such that it has a first and a second portion. There is a mouth integrally attached to the first portion, we anticipate this being molded into the first portion at manufacture. There is a borer with a rod integrally attached. The borer is located within the enclosure such that the rod is slidably connected, able to slide back and forth in side the enclosure.

The rod passes through on of the sealed openings and because the borer is larger than the sealed opening it cannot be slid out from inside the enclosure. The second portion has an opening which we refer to as the mouth.

This embodiment can have the opening such that the opening is removably attached to a workpiece. With the rod being connected to a rotator, such as a handheld drill, and with the borer being slid into position and placed against the workpiece, the borer can be rotated to cut through the workpiece. This allows liquid and debris to go into or out of the workpiece, such as a drain pipe.

An embodiment of the apparatus simplifies accessing a pipe that has its contents under pressure. It facilitates removal of a pipe's access cover, a plug, while the pipe's contents are under pressure. This ease of operation allows for workmen to control the release of pressurized contents from a pipe through its access cover. The removal can be either in whole or in portions, while the pipe's contents are under pressure.

An embodiment of the apparatus facilitates removal of a pipe's access cover while the pipe's contents are under pressure by boring the cover, eliminating stripping of a pipe's access cover, such as stripping of a nut of the access cover, during removal of the cover while the pipe's contents are under pressure.

Because of the internal chamber of the apparatus in its various embodiments, a clear path for material to flow out of a pipe is unencumbered by a pipe's access cover which has just been removed. A user can then further work on the pipe with or without removal of the tool from the pipe, including using another of the at least one sealed openings to pass a water jetting system which would be used to clear stubbornly clogged pipes.

Additionally, an embodiment allows for the bored portion of an access cover of a pipe to be removed from a path that material, such as waste water, will flow after boring of the access cover is completed. A user can then place, by pumping for instance, material, such as waste water that was previously expelled, into a pipe through a previously bored access cover of the pipe. An embodiment of the invention provides easy assembly and disassembly for attachment of the invention onto a workpiece, such as a drain pipe. It can fit any known size access cover of a pipe as well as for any size pipe known. It is sufficiently sized to prevent clogging of the apparatus from waste material, particularly solid waste material, passing through the inside of the apparatus. This allows for speedy, low cost, and efficient clearing of a pipe with pressurized contents.

We envision an embodiment of the apparatus being a hand tool for use on sewer systems with overhead piping. It would eliminate vibrating of the hand tool that occurs when boring through an access cover of a pipe using other hand tools, such as small drill bits. The apparatus being made from materials that facilitate the use of the hand tool on various size access covers such as metal, rubber, PVC, and the like.

This embodiment could have a second of the at least one sealed openings to receive a water jetting hose and allow the hose to pass into the enclosure. Users commonly use hoses emitting jets of water to clear drains of non-moving materials, toilet paper and human excrement for example.

An example of one process involves using an embodiment of the apparatus to clear a pipe of liquid, usually water, and solids.

Another embodiment of the a pipe access tool comprises a cylindrical main body, the main body having at least one sealable rear hole and a detachable head distal the sealable rear hole, the main body having an outlet branch diverging from the main body, the detachable head configured to form a leak-proof seal around a pipe surface. There is a a rod and a borer, The borer has a circular cutting tool attached to the rod that extends away from the cutting tool to a distal drive end. The borer disposed within the cylindrical main body with the drive end extending through the rear hole.

In this embodiment, the borer is configured to be rotated with a drive motor connected to the drive end and to cut a circular opening in the pipe via the cutting tool, a hole saw for example, to expel contents of the pipe through the outlet branch. Ideally, the outlet branch diverges from the main body medial the rear hole and the detachable head.

In this embodiment we envision the detachable head being made from a resilient material that conforms to the pipe surface. The head would work by encircling a raised boss extending perpendicularly to a center axis of the pipe. In this manner, the detachable head forms the leak-proof seal around the raised boss via a hose clamp disposed circumferentially around the detachable head.

An embodiment could be such that the circular cutting tool can be withdrawn along the main body to a position medial the at least one sealable rear hole and the outlet branch to provide a clear passage from the pipe through the outlet branch. The outlet branch has a shut-off valve configured to selectively block and unblock the outlet branch. This allows a user to control the flow of materials out of the pipe, that was just cleared, and out of the apparatus.

Another method embodiment of using a pipe access tool to penetrate a pipe holding pressurized content, the pipe access tool having a cylindrical main body with at least one sealable rear hole at one end and a detachable head at an opposite end, the main body further including an outlet branch diverging from the main body medial the rear hole and the detachable head, a borer disposed within the cylindrical main body, the borer having a circular cutting tool connected to a rod extending away from the cutting tool to a distal drive end extending through the rear hole, the method comprises 1) forming a leak-proof seal between the detachable head and the pipe; then 2) spinning the borer with a drive motor connected to the drive end and advancing the borer along the main body to contact the pipe with the spinning cutting tool; and then cutting a circular opening in the pipe via the rotating cutting tool to release the pipe contents into the main body; and finally expelling the pipe contents from the main body through the outlet branch.

In this method, expelling the pipe could include withdrawing the cutting tool along the main body to a position medial the outlet branch and the rear hole. The method could also involves pumping, or otherwise removing such as with the use of gravity or plunging, the pipe contents from the main body through the outlet branch. This method would benefit from the use of a shut-off valve wherein expelling the pipe contents includes opening the shut-off valve to release the pipe contents and closing the shut-off valve to prevent expelled contents from re-entering the main body.

BRIEF DESCRIPTION OF THE SEVERAL VIEWS OF THE DRAWINGS

These and other features, aspects and advantages of the present invention will become better understood with regard to the following description, appended claims, and accompanying drawings where:

DESCRIPTION

Overview.

Figure 1:
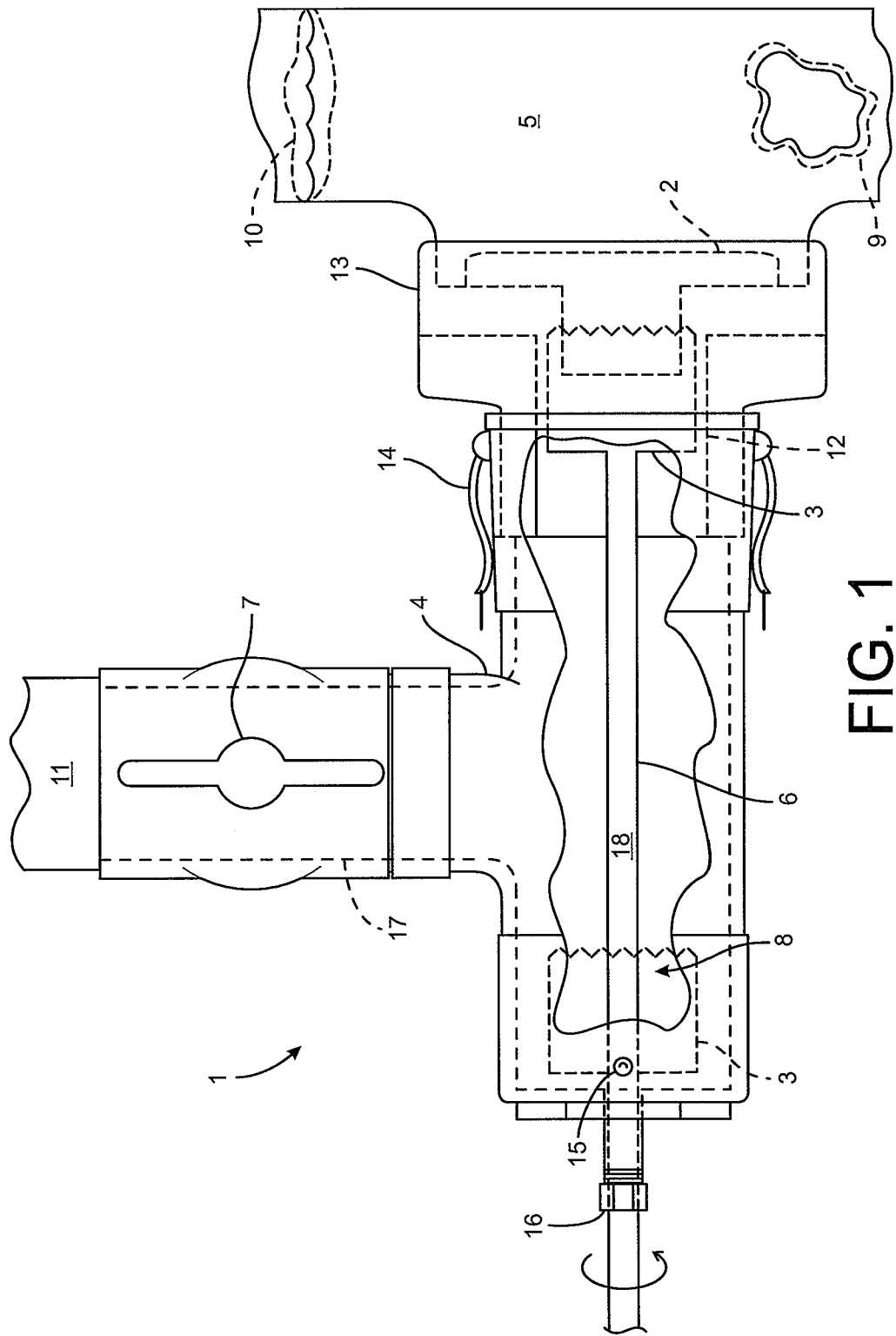
FIG. 1 shows a side view of one embodiment of the inventive apparatus with a cutaway view.

As shown in FIG. 1, one embodiment of the inventive apparatus with a cutaway view comprises a hand tool 1 having a main body 4 and a detachable head 13. The main body 4 and detachable head 13 are attached via at least one fastener 14 that allows for quick attaching and detaching. A borer 18 is slidably attached to the main body 4. The borer 18 having a borer arm 6 and a tooth section 3. The borer arm 6 passes through an entry port 16 that is an integral part of the main body 4. The borer arm 6 slides along the axis of the main body 4. The tooth section 3 is capable of fitting into a channel 12 of the hand tool 1. The channel 12 being located inside of the hand tool 1 and traversing along the axis of the main body 4 and extending sufficiently near to an access cover 2 of a pipe 5, such as a sewer system clean-out. The borer 18 being capable of rotating. The tooth section 3, upon being rotated, is capable of boring through the pipe's access cover 2. Once the access cover 2 is completely bored through, a bored portion of the access cover 2 can remain with the tooth section 3. After boring, the borer 18 can be slidably moved to a location 8 that prevents obstructing a clear path 17 for water 10 and solids 9 to travel and exit the work area through a hose 11. A valve 7 is attachable to the main body 4 to control the flow of water and solids. After the pipe 5 is cleared, the water and solid can be pumped into the clear path 11 in the opposite direction and placed back into the pipe 5, which is cleared. Hooks 15 on the main body can be used to attach a rope (not shown), or the like, for temporarily securing the apparatus to the pipe 5.

Figure 2:
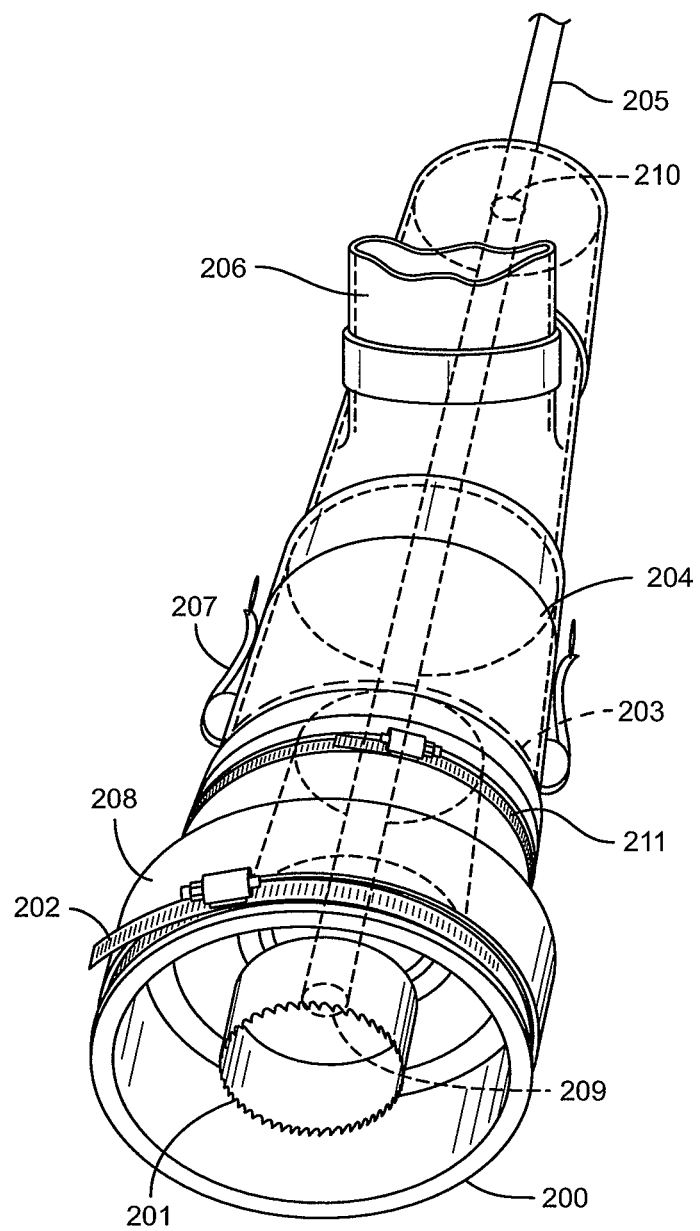
FIG. 2 shows a perspective view of another embodiment of the inventive apparatus.

As shown in FIG. 2, a perspective view of another embodiment of the inventive apparatus 200 comprises a main body 204 attached to a head 208 via at least one means for attaching 207. The main body 204 and the head 208 are attached with one sliding into the other at 203. The head 208 is capable of being attached to a workpiece, such as a sewer drain, via a commonly known radiator hose clamp 202. A circular cutting tool 201 is attached to a rod 205 at 209. The rod 205 passes through one of at least one sealable holes 210 in the main body 204. In this configuration the rod 205 can be spun via use of a drill like tool (not shown) and the circular cutting tool 201 would spin and cut into the workpiece. Contents from inside the sewer drain would rush into the apparatus 200 and travel along a path to an outlet 206.

In this embodiment, different heads 208 can be swapped out via a connecting radiator clamp 211, or the like.

Figure 3:
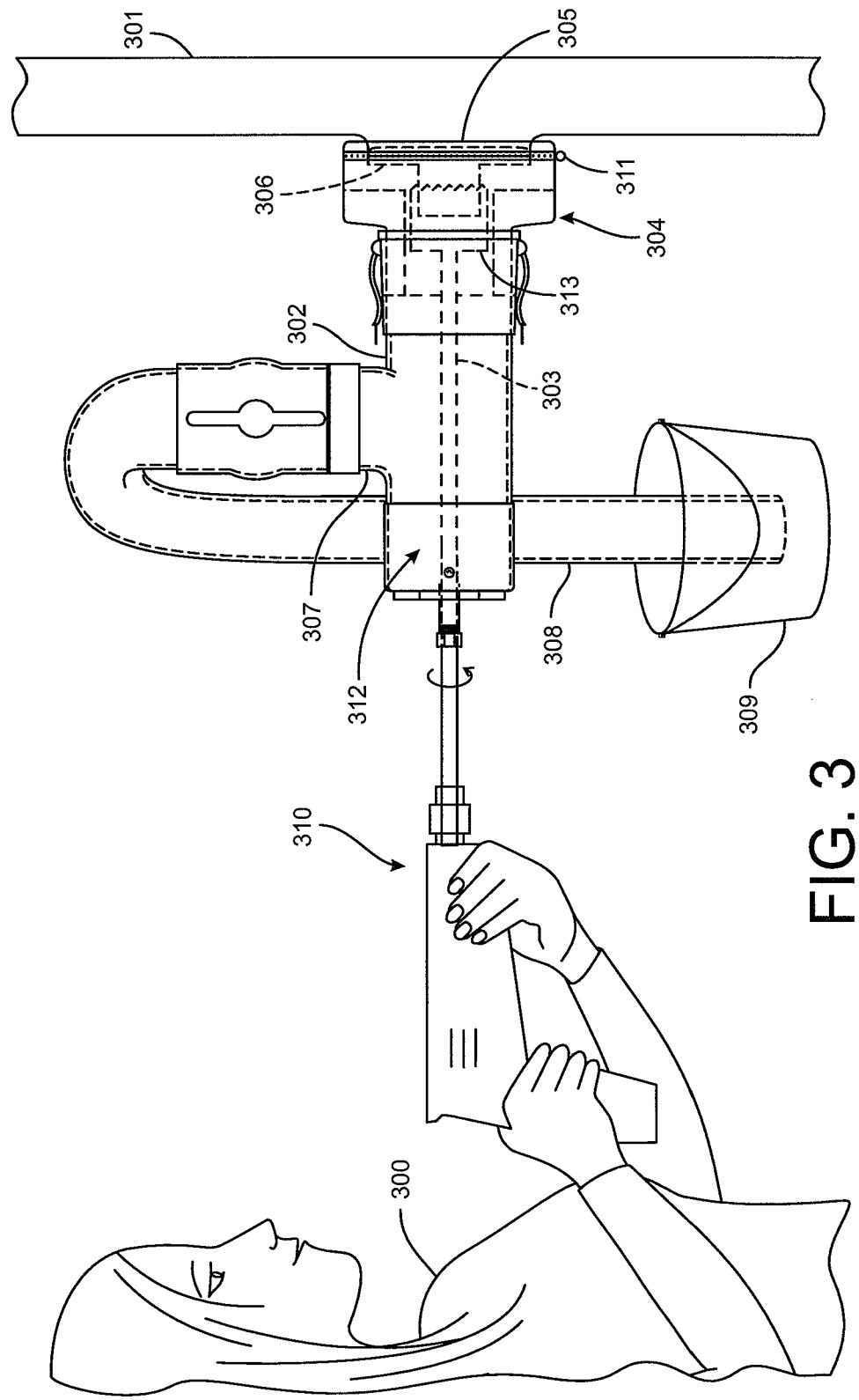
FIG. 3 shows a side view of another embodiment of the inventive apparatus being used on a workpiece.

As shown in FIG. 3, a perspective view of another embodiment of the inventive apparatus being used on a workpiece comprises a plumber 300 working to clear a drain pipe 301 through a clean out cover 306. The apparatus covers the workpiece to be cleared at 304. The plumber uses a drill 310 to connect to and rotate a rod 303. A main portion of the apparatus 302 is connected to a head portion 305 which is clamped to the drain pipe 301 via a common radiator clamp 311. The rod 303 is connected to a circular cutter 313 that cuts through the clean out cover 306 allowing contents within the pipe 301 to flow out of the pipe. The contents flow inside the apparatus along a path and discharges at an outlet 307 into a hose 308 and into a bucket 309. The circular cutter 313 can be slid back within the apparatus and away from the workpiece to a position at 312 thereby not obstructing the contents flowing through the outlet 307.

Although the present invention has been described in considerable detail with the reference to certain preferred versions thereof, other versions are possible. The apparatus can be a unitary construction where the main body and head are one piece, or the apparatus can be made of several pieces to be assembled together. The spirit of the apparatus is to create a way, used by plumbers for instance, for clearing a pipe that has liquid under pressure and yet containing the liquid and controlling its discharge. Therefore, the spirit and scope of the appended claims should not be limited to the description of the preferred versions contained herein.

Any element in a claim that does not explicitly state "means for" performing a specified function, or "step for" performing a specific function, is not to be interpreted as a "means" or "step" clause as specified in 35 U.S.C. § 112, ¶6.

What we claim is:

1. A pipe access tool comprising:
   a cylindrical main body, the main body having a sealable rear hole and a detachable head distal the sealable rear hole, the main body having an outlet branch diverging from the main body, the detachable head configured to form a leak-proof seal around a surface of a pipe;
   the detachable head being made of a resilient material that conforms to the surface of the pipe;
   the detachable head being configured to encircle a raised boss extending perpendicularly to a center axis of the pipe;
   the outlet branch diverging from the main body medial the rear hole and the detachable head;
   a rod;
   a borer;
   the borer having a circular cutting tool attached to the rod that extends away from the cutting tool to a distal drive end;
   the circular cutting tool being a hole saw;
   the borer disposed within the cylindrical main body with the drive end extending through the rear hole;
   the borer configured to be rotated with a drive motor connected to the drive end and to cut a circular opening in the pipe via the cutting tool to expel contents of the pipe through the outlet branch.

2. The pipe access tool of claim 1, wherein the detachable head forms the leak-proof seal around the raised boss via a hose clamp disposed circumferentially around the detachable head.

3. The pipe access tool of claim 1, wherein the circular cutting tool can be withdrawn along the main body to a position medial the rear hole and the outlet branch to provide a clear passage from the pipe through the outlet branch.

4. The pipe access tool of claim 1, wherein the outlet branch further includes a shut-off valve configured to selectively block and unblock the outlet branch.

5. The pipe access tool of claim 1, wherein the pipe access tool simplifies accessing a pipe that has its contents under pressure.

6. The pipe access tool of claim 1, wherein the expelled contents flow through the outlet branch unobstructed.

7. The pipe access tool of claim 1, wherein the pipe access tool is for use on sewer systems with overhead piping.

8. The pipe access tool of claim 1, wherein the pipe access tool eliminates vibrating that occurs when boring though a sewage drain pipe using other hand tools.

9. The pipe access tool of claim 1, wherein the detachable head is made from rubber.

* * * * *